United States Patent [19]

Clausen et al.

[11] Patent Number: 4,636,035
[45] Date of Patent: Jan. 13, 1987

[54] TRANSPARENT REAR PROJECTION SCREEN

[75] Inventors: Erik Clausen; Johannes Clausen, both of Gentofte; Holger Jensen, Glostrup; Finnur Sturluson, Roskilde, all of Denmark

[73] Assignee: Scan Screen A/S, Roskilde, Denmark

[21] Appl. No.: 801,844

[22] Filed: Nov. 26, 1985

[30] Foreign Application Priority Data

Aug. 30, 1985 [DK] Denmark ............................ 3975/85

[51] Int. Cl.⁴ .......................................... G03B 21/60
[52] U.S. Cl. .................................................. 350/128
[58] Field of Search ................................ 350/127–129

[56] References Cited

U.S. PATENT DOCUMENTS

| 4,152,047 | 5/1979 | Inoue | 350/129 X |
| 4,536,056 | 8/1985 | Oguino | 350/128 |
| 4,548,469 | 10/1985 | Inoue et al. | 350/128 |
| 4,561,720 | 12/1985 | Clausen et al. | 350/128 |

FOREIGN PATENT DOCUMENTS 59436  4/1983  Japan .................. 350/128

Primary Examiner—Richard A. Wintercorn
Attorney, Agent, or Firm—Watson, Cole, Grindle & Watson

[57] ABSTRACT

A rear projection screen consists of a Fresnel lens and a picture-forming screen placed in front of it. The picture-forming screen has vertical backward convex lenses on its back and vertical masking strips on its front and strip-shaped sections situated between the masking strips and opposite the backward convex lenses. Each of these is designed to refract light rays coming from behind so that they are directed towards the strip-shaped sections. In order to increase the picture resolution or definition capability of the screen and to avoid notch sensitivity between the backward convex lenses an intermediate lens is provided between every two of the backward convex lenses. Every intermediate lens has two sides shaped in such a way that the rays which hit one side of each intermediate lens are refracted so that they are directed towards the strip-shaped section which is situated opposite to the backward convex lens which is adjacent to the other side of the intermediate lens concerned, and that the rays which hit the other side of the intermediate lens concerned are refracted so that they are directed towards the strip-shaped section with is situated opposite to the backward convex lens which is adjacent to said one side of the intermediate lens concerned.

9 Claims, 10 Drawing Figures

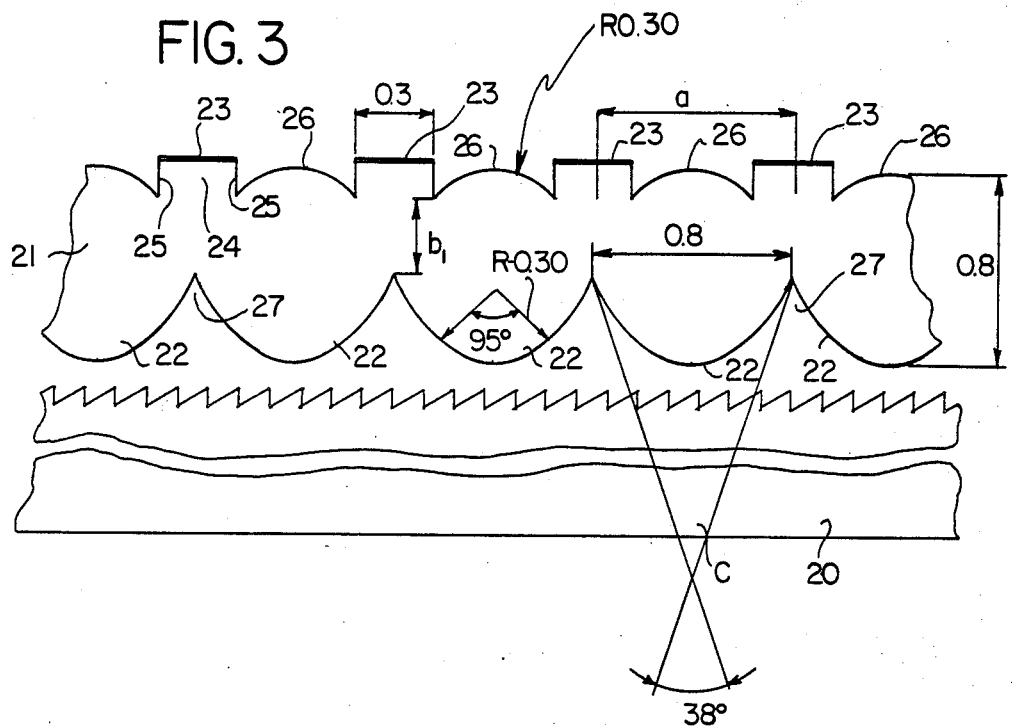
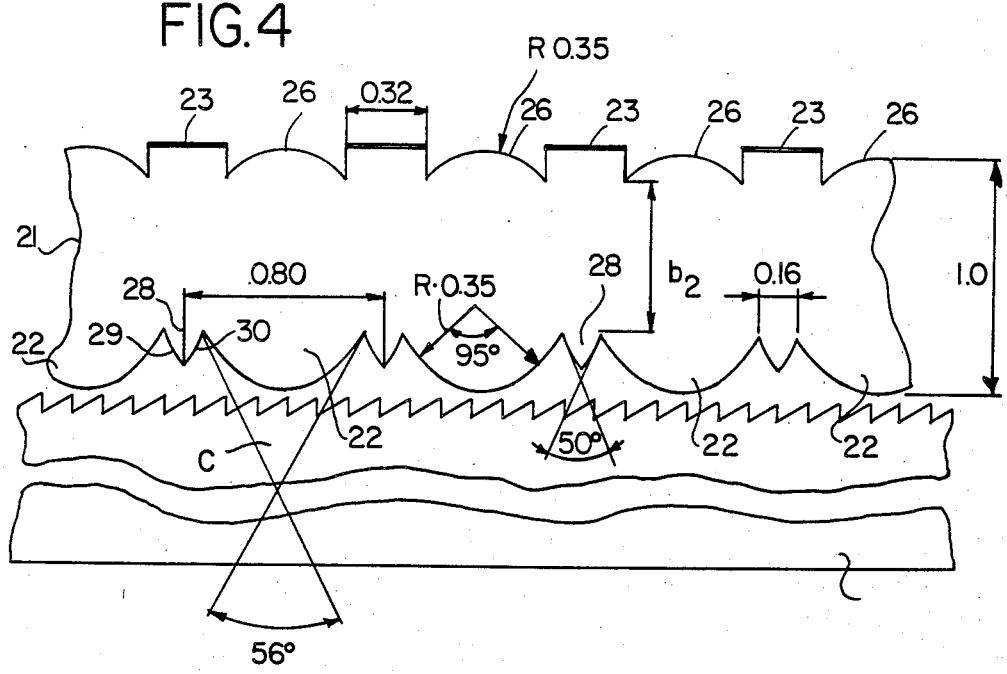

TRANSPARENT REAR PROJECTION SCREEN

BACKGROUND OF THE INVENTION

The present invention relates to a transparent rear projection screen of the kind comprising a sheet-shaped Fresnel lens and a picture-forming sheet-shaped screen mounted in front of the Fresnel lens (as viewed by the watcher or watchers). The back of the screen has vertical, backward convex lenses which are situated vertically in the working position of the screen, and vertical masking strips on its front which are interspaced by strip-shaped sections positioned opposite to the backward convex lenses, each of these last-mentioned lenses being designed in such a way as to refract the light rays from the Fresnel lens which hit them so that these rays are emitted through the strip-shaped sections.

Such a screen is disclosed in Danish patent application No. 4725/83 filed in the name of Dai Nippon Insatsu Kabushiki Kaisha, Japan, in which priority is claimed from Oct. 15, 1982 (Japanese application No. 180790/82), Oct. 15, 1982 (Japanese application No. 155928/82), and Dec. 3, 1982 (Japanese application No. 183175/82).

Such a screen has the effect that the backward convex lenses of the picture-forming screen focus all the rays coming from the Fresnel lens on the strip-shaped sections so that loss of light is avoided and a strongly luminous picture is thus obtained. The masking strips provide the screen with a good contrast effect since to a great extent they prevent ingress of disturbing light from the front into the picture-forming screen.

In order to improve the picture resolution or definition capability of such screens it is desirable to reduce the pitch of the screen which in this case means the distance between the central axes of two adjacent masking strips, or in other words the distance between the apices of two adjacent backward convex lenses. In order to reduce this pitch it is necessary that the lenses facing backward are designed with a correspondingly reduced focal length since if not they will be unable to focus all the light on the strip-shaped sections. In order to reduce this focal length the curvature of the lenses facing backward has to be increased, with the effect that their side edges will be positioned closer to the front of the picture-forming screen. Hence deep notches will, however, be formed between the backward convex lenses, and as the screen is already very thin, the effect will be a higher risk of rupture when the picture-forming screen is handled, especially due to the notch sensitivity which is aggravated further by the fact that screens of this nature are relatively large (approx. 1 m²).

It is an objective of the present invention to provide a screen of the kind referred to above with a high picture resolution or definition capability and where such a notch sensitivity is avoided by maintenance of a relatively small screen thickness.

SUMMARY OF THE INVENTION

According to the present invention a screen of the kind referred to above is characteristic in that every two of the backward convex lenses on the back of the picture-forming screen are separated by a vertical intermediate lens having two opposite sides designed in such a way that the light rays from the Fresnel lens entering one side of each intermediate lens, are refracted so that they flow generally in the direction of the strip-shaped section which is positioned opposite to the backward convex lens adjacent to the other side of the intermediate lens concerned, and that the light rays coming from the Fresnel lens and entering the other side of the intermediate lens concerned are refracted so that they flow generally in the direction of the strip-shaped section which is positioned opposite of the backward convex lens adjacent to said one side of the intermediate lens concerned. Hereby it is achieved that the strip-shaped sections can be made narrow for obtaining a good picture resolution or definition without weakening the back of the picture-forming screen since the notches which would otherwise occur between the backward convex lenses by increasing their curvature (or reducing their focal length) are replaced by the intermediate lenses. Since these lenses also refract the light from the Fresnel lens which hits them so that this light is emitted through the strip-shaped sections, this light is utilized for the illumination of the picture.

Rear projecting screens of the kind here concerned are especially suitable for showing of television pictures which are produced by three projectors directed towards the back of the screen and each emitting a black-white tv picture and where a filter is placed in front of each projector so that the picture transferred to the screen by one projector is red, by the second projector green, and by the third projector blue. As these three projectors cannot be placed so that their optical axes coincide since in that case they will shade each other, they are placed side by side. As their optical axes have to be directed towards the centre of the back of the screen in order to produce as good coincidence of the three projected pictures as possible, the rays hitting the back of the projection screen will converge at angles of approx. 7°. The effect will be that unless special precautious are taken the red, green and blue rays which emanate from the screen will diverge 7° relative to each other. To remedy this fact it is known to design the strip-shaped sections forward convex since in this way they will act as lenses compensating for the divergence of 7° mentioned in the foregoing. A screen with strip-shaped sections of this kind is explained in the previously mentioned Danish patent application No. 4725/83. It is also known therefrom to design the backward convex lenses in such a way that their focal length corresponds to the distance between the apices of the backward convex lenses and the strip-shaped sections. This design results in a good sharpness of image.

A preferred embodiment of the screen according to the present invention where the strip-shaped sections between the masking strips are forward convex as well as where the focal length of the backward convex lenses corresponds generally to the distance between the apices of the backward convex lenses and the apices of the forward convex sections, is according to the invention characteristic in that the focal length of these forward convex sections corresponds generally to the focal length of the backward convex lenses.

BRIEF DESCRIPTION OF THE DRAWINGS

FIG. 3 is a section through a part of an imagined embodiment of a rear projection screen for elucidation of the problem which the present invention aims to solve, FIG. 4 is part of a section through an embodiment of the rear projection screen according to the present invention.

DESCRIPTION OF THE PREFERRED EMBODIMENT

Figure 1:
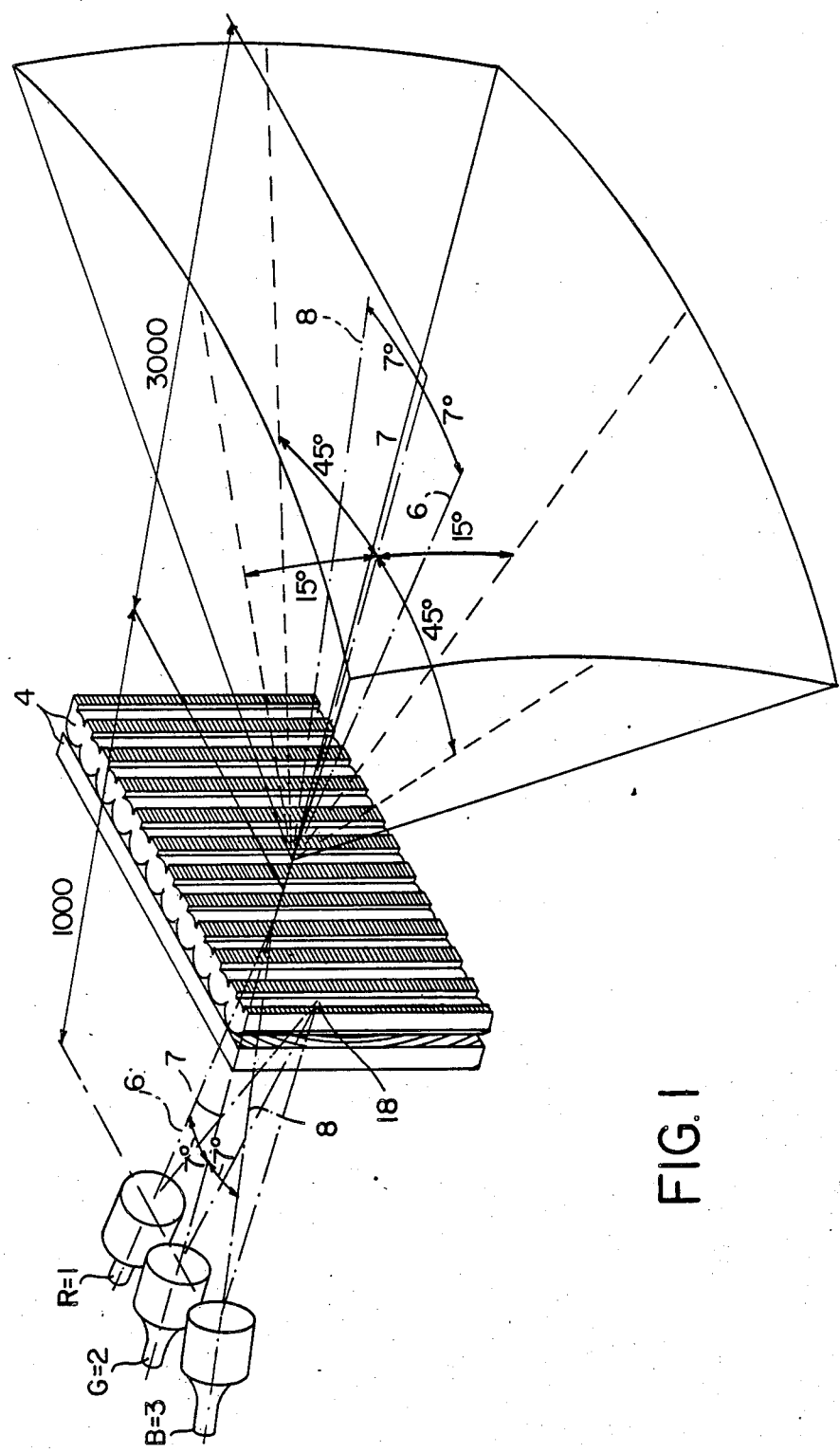
FIG. 1 is a schematic representation of a preferred use of the rear projection screen according to the invention, FIG. 2 in perspective is a section of a picture-forming screen for an embodiment of the rear projection screen according to the invention.
Figure 2:
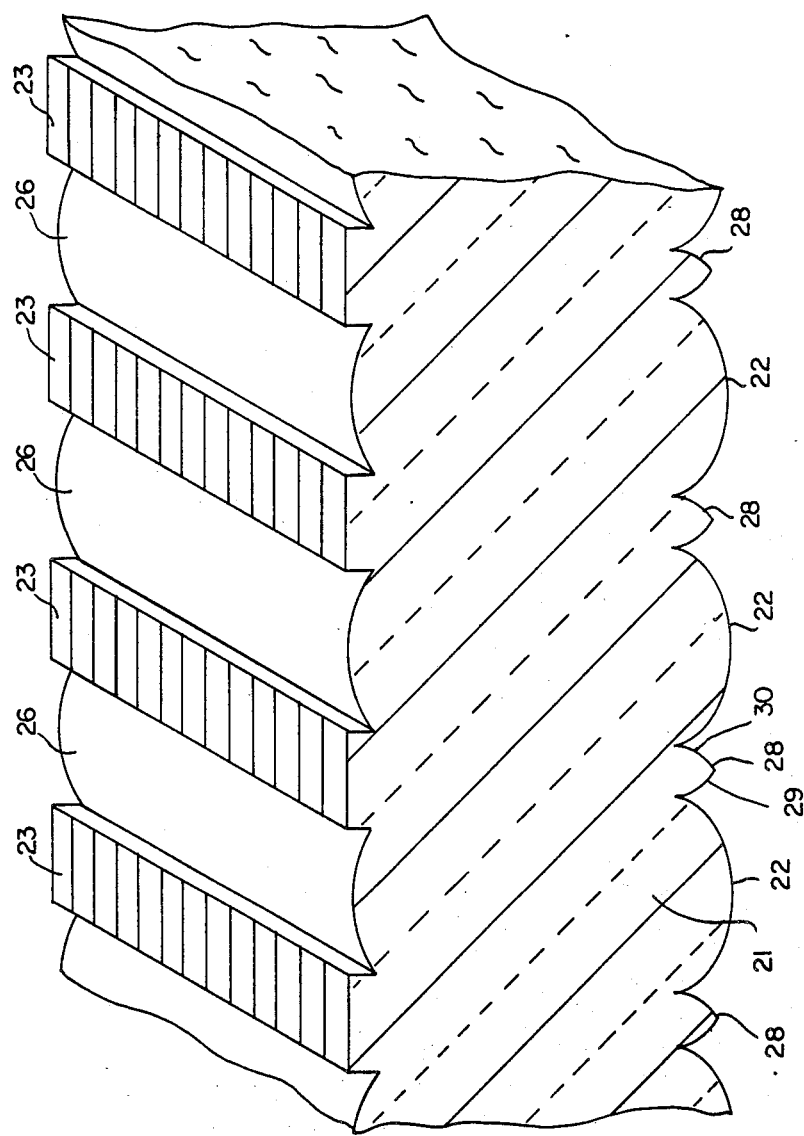

FIG. 1 shows three projectors 1,2 and 3 for projection of television pictures on the back of a projection screen 4. Each projector transfers a black-white television picture, but a filter is placed in front of projector 1 so that the picture which this projector transfers to screen 4 is red. A filter is placed in front of projector 2 so that the picture which this projector transfers to screen 4 is green, and projector 3 uses a filter so that the picture transferred by this projector is blue. The three projectors 1,2 and 3 are placed side by side, with the optical axis 7 of the central projector 2 at right angles to the centre of screen 1. Since the projectors have a certain width, they cannot be placed with their optical axes 6 and 8 coinciding with axis 7, and instead the three optical axes form angles of 7° two and two. It is difficult to go below these 7° because of the size of the projectors. On the contrary, the development is towards more and more powerful projectors which therefore take up more space in the lateral direction so that the said angle of 7° may very well increase up to 10°. The optical axes are directed towards the centre of screen 4 and the projectors are arranged so that the pictures projected on to the back of screen 4 cover each other as well as possible. The result is that a picture corresponding to the one transferred by the picture tube of a colour tv can be watched on the front of screen 4, but the picture is of a better quality and a larger size. By means of a frame shown dotted in FIG. 1 an auditorium is indicated. The formation of the television picture on screen 4 is dependent on the screen having picture-formed characteristics, which are, normally, produced by a light-diffusing material being mixed into the screen or part of it.

FIG. 1 shows the ray path from the three projectors to the centre of screen 4 as well as the ray path from the three projectors to a point on the screen which is to the left of the centre. It will be understood from FIG. 1 that every point on the back of screen 4 will be hit by red, green and blue light rays forming the angle relative to each other which is explained in the foregoing.

The rear projection screen according to the present invention is designed especially, but not exclusively, for the application explained in the foregoing.

FIG. 3 shows an imagined idealized screen. It consists of a sheet-shaped Fresnel lens 20 with its flat back facing the projector or the projectors during use, and with its front provided with concentric grooves, one side of which is at right angles to the plane of the sheet while the other side is inclined relative thereto. Such a screen, which consists of light refracting material, e.g. acrylic, is characteristic in that it deflects rays coming from behind so that these rays leave this screen parallel to each other. However, this only applies to the rays which come from a projector whose optical axis is at right angles to the screen and which pass through the centre of the concentric grooves. This will thus apply to the green rays from projector 2 in FIG. 1.

A picture-forming lens 21 is places in front of the Fresnel lens. It also consists of a light refracting material e.g. acrylic. This screen is designed with backward convex lenses 22 which extend vertically in the working position of the screen. The front of screen 21 is provided with a masking consisting of strips 23 consisting of black paint or ink which are applied to elevations 24, the sides 25 of which are almost at right angles to the plane of the screen. Strip-shaped sections 26 are situated between every two adjacent strips. In the embodiments shown these strip-shaped sections are designed as forward convex lenses since, as mentioned, the embodiments shown are intended primarily for use as described in connection with FIG. 1. Such forward convex sections will actually have the effect of compensating for the convergence of the optical axes 6, 7 and 8 of the projectors mentioned in the foregoing, viz. so that the red and blue rays projected from projectors 1 and 3 will be deflected so as to flow parallel to the rays coming from projector 2 when they leave the front of the composite screen.

As mentioned, screen 21 in FIG. 3 is idealized and has the following characteristics: A high masking percentage since masking strips 23 cover approximately 40% of the screen front. The pitch of screen 21 is very small. By the pitch of the screen is understood the distance a shown in FIG. 3, i.e. the distance from centre to centre of masking strips 23. This is tantamount to the backward convex lenses 22 also having the pitch distance a between their apices. The high masking percentage has the effect that little light from the outside can penetrate into the screen front and thus blur the projected picture, and the screen thus has a good contrast effect. The screen also has a good picture resolution or definition capability since by virtue of a small pitch the strip-shaped sections 26 are also placed close to each other and are also narrow thanks to the large width of the masking strips. Screen 21 also has the effect that the picture is well illuminated. The backward convex lenses 22 are actually designed in such a way that the light hitting them from behind from the Fresnel lens is deflected so that the light is directed towards the strip-shaped sections 26 so that no light is lost because of absorption in masking strips 23 or as a result of total reflection when it hits the forward surface of screen 21. To achieve this, the backward convex lenses 22 must be strongly curved as shown in FIG. 3, and their side edges and the areas of these lenses adjoining thereto must especially be positioned close to the screen front. The result is that distance $b_1$ between the notches 27 formed between the backward convex lenses and the notches formed by the adjacent edge parts of the forward convex lenses 26 and the sides 25 is very short. Since the thickness of screen 21 is already very small (0.80 mm in FIG. 3), the effect of the short distances $b_1$ or rather the deep notches 27 result in that the strength of screen 21 becomes very weak. In the first place, the remaining material thickness $b_1$ is very small, and in the second place the notches 27 result in a marked notch sensitivity.

Such a notch sensitivity and weakening of the picture-forming screen 21 is remedied according to the present invention such as explained in the following.

Figure 6:
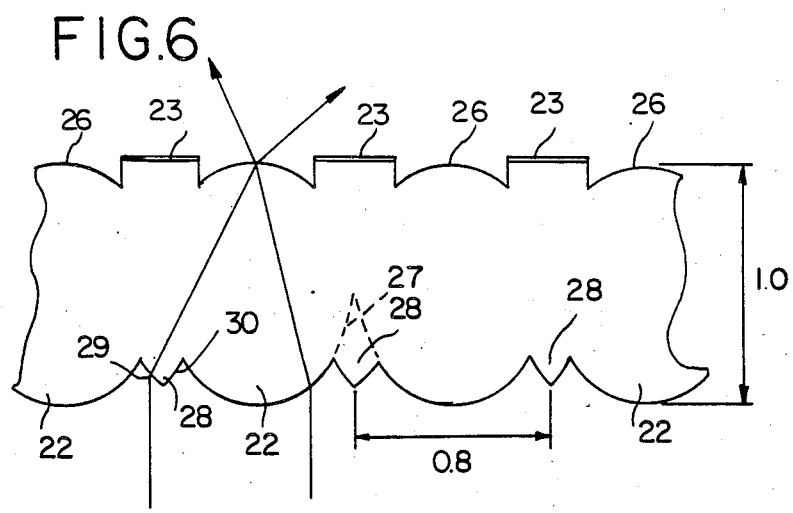

FIG. 4 shows an embodiment of the rear projection screen according to the present invention with a picture-forming screen 21 which as far as the optical characteristics are concerned corresponds to screen 21 in FIG. 3, but where the weaknesses explained in the foregoing have been remedied. This is achieved by providing intermediate lenses 28 between every two of the backward convex lenses 22. There is thus positioned an intermediate lens 28 opposite to every masking strip 23 since the strip-shaped sections 26 and the backward convex lenses 22 are placed opposite to each other. Every intermediate lenses 28 has two sides 29 and 30 which in the embodiments shown are designed with a curvature turning away from each other, but which may very well be plane. In FIG. 6, which shows a section through a picture-forming screen 21 corresponding to the one shown in FIG. 4, it can be seen how the intermediate lenses 28 fill the notches 27 which would otherwise occur between the backward convex lenses 22 for achieving the effect mentioned in the foregoing, viz. emission of all the light which hits a backward convex lens through the strip-shaped section 26 opposite to it.

Omission of these notches has the effect that the thickness $b_1$ previously mentioned is then greatly increased to $b_2$ such as shown in FIG. 4. As a matter of fact, screen 21 in FIG. 4 has a thickness of 1.0 mm, but the said distance will also be increased considerably even if screen 21 has a thickness of only 0.8 mm as it can be seen clearly from FIG. 9.

The presence of the intermediate lenses also has the effect that the vertical angle c of the backward convex lenses 22 is increased greatly, being 38° in the embodiment in FIG. 3, but 56° in the embodiment in FIG. 4. This also facilitates the design of the tools for production of the backward convex lenses 22.

Figure 8:
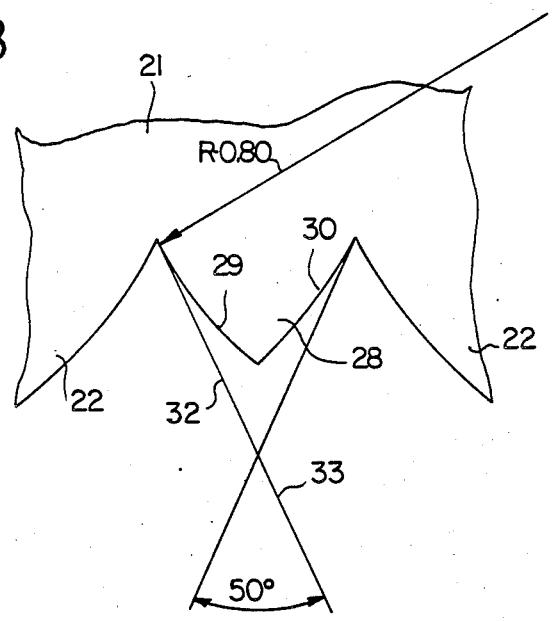
FIG. 8 is a section of FIG. 4 on an enlarged scale.

FIG. 8 shows an intermediate lens 28 on a further enlarged scale, from which it can be seen that sides 29 and 30 curving away from each other each has a radius of curvature of approx. 0.80 mm. It can also be seen that tangent planes 32,33 to the side parts of lens sides 29 and 30 adjacent to the root end 28 of the intermediate lens, form a mutual angle of 50°. This angle may, however, vary within wide limits, viz. 40° to 75°, appropriately between 45° and 60° and is preferably 50° as shown. If sides 29 and 30 are plane, they will preferably form a vertical angle of 55° which may, however, also vary within wide limites, viz. 45° to 80°, appropriately between 50° and 60° and preferably be approx. 55° as mentioned.

In the embodiment shown in FIG. 8 sides 29 and 30 have a radius of curvature of 0.80 mm, but this radius may also vary within wide limits, viz. 0.2 and 2.0 mm, appropriately between 0.5 and 1.5 mm and is preferably 0.80 mm as mentioned. The ray path through the embodiments shown will now be explained further.

For the sake of simplicity, the drawing shows only the ray path from a single projector, the optical axis of which is at right angles to the screen and passes through its centre, i.e. the ray path of green light emitted by projector 2, in the case where the screen is used as explained in connection with FIG. 1. In the last-mentioned case the ray paths of the red and blue lights will, as far as the flow within the screens and between these is concerned, diverge by the 7° mentioned in the foregoing relative to the green light, but this divergence will be compensated for as explained, thanks to the design of the strip-shaped sections 26 as forward convex lenses. Consequently, it will also be understood that if the screen is used in connection with a single projector, the strip-shaped sections 26 will be plane.

Figure 5:
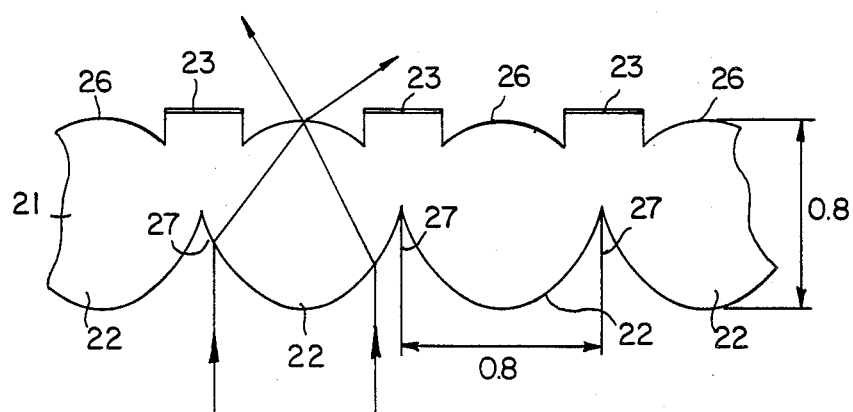
FIG. 5 is part of the picture-forming screen for the rear projection screen shown in FIG. 3, FIGS. 6 and 7 are pictures for elucidation of the ray path in a picture-forming screen for the embodiment shown in FIG. 4 of the rear projection screen according to the invention.

The ray path through the idealized screen 21 can be seen in FIG. 5 from which it appears that the parallel rays coming from behind and being at right angles to the plane of the screen are deflected so that they emit from the strip-shaped sections 26. The focal length of the backward convex lenses 22 corresponds to the distance between the apices of two lenses 22,26 opposite to each other. Besides, the strip-shaped sections 26 designed as lenses have a focal length which corresponds to the focal length of the backward convex lenses 22.

Figure 7:
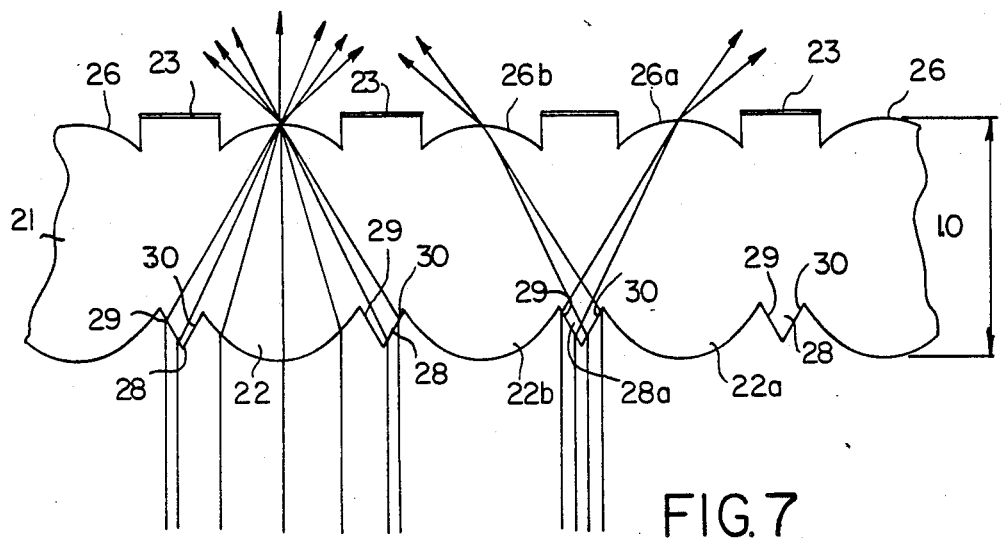

It will be seen from FIGS. 6 and 7 which show the same picture-forming screen 21 as FIG. 4 that all light which hits each of the backward convex lenses 22 will be directed towards the centre of the corresponding strip-shaped sections 26 in the same way as in FIGS. 3 and 5. As far as a single intermediate lense 28a is concerned, the ray path is shown to the right in FIG. 7. It is seen herefrom that the light rays coming from the Fresnel lens and which from the rear enter into one side 29 of this intermediate lens 28a will be refracted so that they flow in the direction towards the strip-shaped section 26a which is opposite to the backward convex lens 22a which is adjacent to the other side 30 of the intermediate lens 28a concerned, and that the light rays coming from the Fresnel lens and which from the rear enter into the other side 30 of the intermediate lens 28a concerned are refracted so that they flow in the direction towards the strip-shaped section 26b which is situated opposite to the backward convex lens 22b which is adjacent to said one side 29 of the intermediate lens 28a concerned. As the ray path in FIGS. 6 and 7 is shown optimized, the sides 29 and 30 of the intermediate lenses 28 are curved in such a way that the rays deflected thereby are focused in the centre of the strip-shaped sections concerned, 26a and 26b respectively in FIG. 7.

Figure 9:
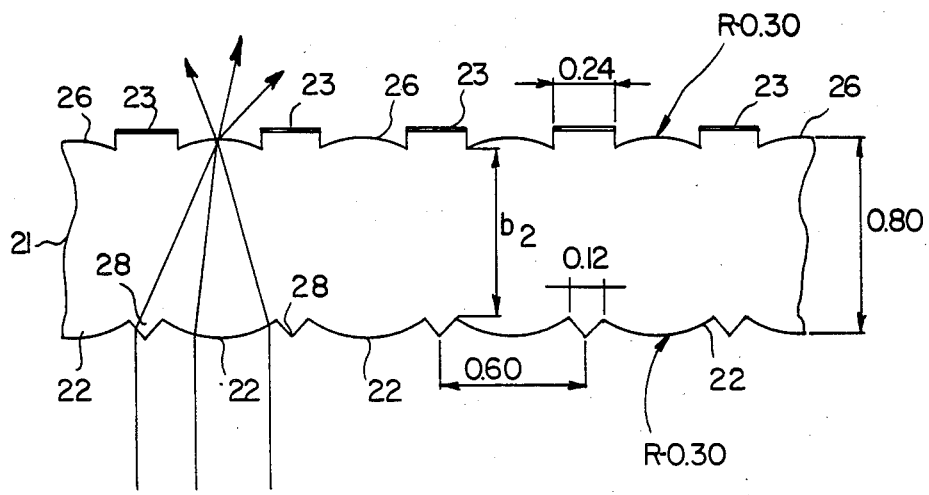
FIGS. 9 and 10 are further embodiments of the picture-forming screen for the rear projecting screen according to the present invention.
Figure 10:
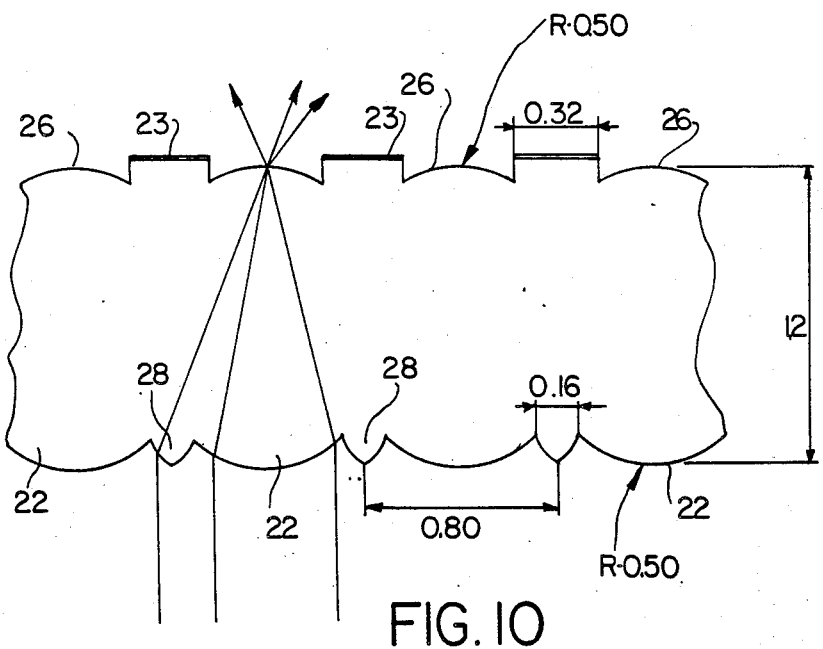

The picture-forming screen 21 i FIGS. 4, 6 and 7 has a thickness of 1.0 mm. As previously mentioned, the thickness may, however, be smaller and larger such as it can be seen from FIGS. 9 and 10 respectively, as FIG. 9 shows an embodiment of the picture-forming screen 21 with a thickness of 0.8 mm, and FIG. 10 shows an embodiment of the picture-forming screen 21 with a thickness of 1.2 mm. In all cases a ray path is obtained as previously explained.

It can be seen from the drawing that the picture-forming screens 22 have the following dimensions:

At a thickness of 0.8 mm; pitch=0.60 mm; width of masking strips 0.24 mm; radius of curvature of forward convex lenses=0.30 mm; radius of curvature of backward convex lenses=0.30 mm; width of interdediate lenses at root end 0.12 mm; radius of curvature of sides of intermediate lenses 0.6 mm; vertical angle of tangent planes to the root part of the sides of the intermediate lenses 50°.

At a thickness of 1.0 mm; pitch=0.80 mm; width of masking strips 0.32 mm; radius of curvature of forward convex lenses=0.35 mm; radius of curvature of backward convex lenses=0.35 mm along an arc measure of 50°; width of intermediate lenses at root end=0.16 mm; radius of curvature of sides of intermediate lenses 0.80 mm; vertical angle of tangent planes to the root parts of the sides of the intermediate lenses=50°.

At a thickness of 1.2 mm; pitch=0.80 mm; width of masking strips 0.30 mm; radius of curvature of forward convex lenses=0.50 mm; radius of curvature of backward convex lenses 0.50 mm; width of intermediate lenses at root end=0.16 mm; radius of curvature of sides of intermediate lenses 1.1 mm; vertical angle of tangent planes to the root parts of the sides of the intermediate lenses 70°.

It will be seen that the width of the intermediate lenses in these examples constitutes 20% of the screen pitch. Deviations may, however, also occur here since this width can deviate between 15 and 25%, appropriately between approx. 17 and 23%, and as mentioned preferably is approx. 20% of the pitch.

In all the examples shown 40% of the front of the rear projection screen is covered by masking strips 23, but experiments have shown that a masking of up to 60% is possible to increase of the contrast effect further.

Experiments have also shown that the reflection from the back of the picture-forming screen 21 is reduced considerably by placing the intermediate lenses 28 as compared to the case where the back of the picture screen 21 is provided with deep notches as shown in FIG. 3, which has the advantage that the contrast in the projected picture is increased considerably.

We claim:

1. A transparent rear projection screen of the kind comprising a sheet-shaped Fresnel lens (20) and a picture-forming sheet-shaped screen (21) placed in front of the Fresnel lens, as viewed by the watcher or watchers, the back of which picture-forming screen is provided with backward convex lenses (22) which are situated vertically in the working position of the screen, and the front of which picture-forming screen is provided with masking strips (23) which are also vertical, and strip-shaped sections (26) between these masking strips, which strip-shaped sections are positioned opposite to the backward convex lenses (22), each of these last-mentioned lenses being designed in such a way as to refract the light rays from the Fresnel lens (20) which hit them so that these rays are emitted through the strip-shaped sections (26), characterized in that between every two of the backward convex lenses (22) on the back of the picture-forming screen (21) a vertical intermediate lens (28) is provided comprising two opposite sides (29 and 30) designed in such a way that the light rays coming from the Fresnel lens (20) and which from the rear enter into one side (29) of each intermediate lens (28a), are refracted so that they flow generally in the direction towards the strip-shaped section (26a) which is situated opposite to the backward convex lens (22a) which is adjacent to the other side (30) of the intermediate lens (28a) concerned, and that the light rays coming from the Fresnel lens (20) and which from the rear enter into the other side (30) of the intermediate lens (28a) concerned are refracted so that they flow generally in the direction towards the strip-shaped section (26b) which is situated opposite to the backward convex lens (22b) which is adjacent to the said one side (29) of the intermediate lens (28a) concerned.

2. A rear projection screen as claimed in claim 1, characterized in that the sides (29 and 30) of the intermediate lenses (28) generally are plane and form a vertical angle of between 45° and 80°, appropriately between 50° and 60°, and preferably approx. 55°.

3. A rear projection screen as claimed in claim 1, characterized in that the sides (29 and 30) of the intermediate lenses (28) curve away from each other, and that the tangent planes (32,33) to the parts of sides (29 and 30) adjacent the root ends of the intermediate lenses (28) form a vertical angle of between 40° and 75°, appropriately between 45° and 60°, and preferably 50°.

4. A rear projection screen as claimed in claim 3, characterized in that the radius of curvature of the curved sides (29 and 30) of the intermediate lenses (28) is between 0.2 and 2.0 mm, appropriately between 0.5 and 1.5 mm, and preferably is 0.8 mm.

5. A rear projection screen as claimed in claim 1, characterized in that the width of the intermediate lenses (28) at their root ends is between approx. 15% and approx. 25%, appropriately between approx. 17% and 23%, and preferably is approx. 20% of the screen pitch.

6. A rear projection screen as claimed in claim 1, and where the strip-shaped sections (26) between the masking strips (23) are forward convex as well as where the focal length of the backward convex lenses (22) corresponds, generally, to the distance between the apices of the backward convex lenses (22) and the apices of the forward convex sections (26), characterized in that the focal length of the forward convex sections (26) corresponds, generally, to the focal length of the backward convex lenses (22).

7. A rear projection screen as claimed in claim 1, characterized in that the picture-forming screen (21) with a thickness of approx. 0.8 mm has a pitch of approx. 0.6 mm, a width of the masking strips of approx. 0.25 mm, a radius of curvature of the forward convex lenses of the backward convex lenses of approx. 0.3 mm, and a width of the intermediate lenses (28) at their root ends of approx. 0.12 mm.

8. A rear projection screen as claimed in claim 1, characterized in that the picture-forming screen (21) with a thickness of approx. 1.0 mm has a pitch of approx. 0.8 mm, a width of the masking strips (23) of approx. 0.32 mm, a radius of curvature of the forward convex lenses (26) and of the backward convex lenses of approx. 0.35 mm, and a width of the intermediate lenses (28) of their root ends of approx. 0.16 mm.

9. A rear projection screen as claimed in claim 1, characterized in that the picture-forming screen (21) with a thickness of approx. 1.2 mm has a pitch of approx. 0.8 mm, a width of the masking strips (23) of approx. 0.32 mm, a radius of curvature of the forward convex lenses (26) and of the backward convex lenses (22) of approx. 0.50 mm and a width of the intermediate lenses (28) at their root ends of approx. 0.16 mm.

* * * * *